United States Patent
Baldwin et al.

(10) Patent No.: US 8,161,371 B2
(45) Date of Patent: Apr. 17, 2012

(54) METHOD AND SYSTEM FOR DEFINING A HEIRARCHICAL STRUCTURE

(75) Inventors: Timothy John Baldwin, Southampton (GB); Philip Paul Morris, Scaldwell (GB); Manfred Georg Oevers, Tucsiugen (DE)

(73) Assignee: International Business Machines Corporation, Armonk, NY (US)

( * ) Notice: Subject to any disclaimer, the term of this patent is extended or adjusted under 35 U.S.C. 154(b) by 1019 days.

(21) Appl. No.: 11/740,964

(22) Filed: Apr. 27, 2007

(65) Prior Publication Data

US 2007/0299867 A1 Dec. 27, 2007

(30) Foreign Application Priority Data

Jun. 23, 2006 (GB) .................................. 0612433.3

(51) Int. Cl.
*G07F 17/00* (2006.01)

(52) U.S. Cl. ........ 715/208; 715/206; 715/207; 715/760; 707/796; 707/797

(58) Field of Classification Search ........................ None
See application file for complete search history.

(56) References Cited

U.S. PATENT DOCUMENTS

| | | | | |
|---|---|---|---|---|
| 4,972,328 A * | 11/1990 | Wu et al. ........................... | 706/59 |
| 5,434,971 A * | 7/1995 | Lysakowski, Jr. ............... | 702/31 |
| 5,446,575 A * | 8/1995 | Lysakowski, Jr. .................... | 1/1 |
| 5,557,722 A * | 9/1996 | DeRose et al. ................ | 715/234 |
| 5,623,658 A * | 4/1997 | Kiuchi et al. ......................... | 1/1 |
| 5,649,180 A * | 7/1997 | Danno et al. ......................... | 1/1 |
| 5,668,966 A * | 9/1997 | Ono et al. ..................... | 715/853 |
| 5,740,053 A * | 4/1998 | Iwama ........................... | 700/121 |
| 5,748,186 A * | 5/1998 | Raman .......................... | 715/236 |
| 5,764,513 A * | 6/1998 | Toyota ............................. | 700/95 |
| 5,812,135 A * | 9/1998 | Kotchey ....................... | 715/853 |
| 5,832,470 A * | 11/1998 | Morita et al. ......................... | 1/1 |
| 5,832,471 A * | 11/1998 | Fukui .................................. | 1/1 |
| 5,856,827 A * | 1/1999 | Sudo ............................. | 715/841 |
| 5,870,751 A * | 2/1999 | Trotter ................................ | 1/1 |
| 5,892,678 A * | 4/1999 | Tokunoh et al. .............. | 716/102 |
| 5,970,496 A * | 10/1999 | Katzenberger ........................ | 1/1 |
| 5,977,948 A * | 11/1999 | Nishibori ...................... | 715/841 |
| 5,999,730 A * | 12/1999 | Lewis ........................... | 717/109 |
| 6,016,497 A * | 1/2000 | Suver .................................. | 1/1 |
| 6,144,962 A * | 11/2000 | Weinberg et al. .................... | 1/1 |
| 6,175,364 B1 * | 1/2001 | Wong et al. ................... | 715/763 |
| 6,282,281 B1 * | 8/2001 | Low ............................... | 379/230 |
| 6,370,537 B1 * | 4/2002 | Gilbert et al. ........................ | 1/1 |

(Continued)

OTHER PUBLICATIONS

Qi, Naizhen et al., "A Path-table-based Access Control Model for XML Database Systems," IBM Research, Tokyo Research Laboratory, published Nov. 6, 2003, pp. 1-8.*

(Continued)

*Primary Examiner* — Farhan Syed
(74) *Attorney, Agent, or Firm* — Law Office of Jim Boice (57) ABSTRACT

A hierarchical structure is provided. The hierarchical structure includes object items for objects located in the hierarchical structure, each object item having a name and a link. The hierarchical structure also includes node items each having a name of a hierarchical path name. A node item is provided for each unique path name in the hierarchical structure and the link of an object item links to a single node item having the hierarchical path name of the object.

19 Claims, 11 Drawing Sheets

U.S. PATENT DOCUMENTS

| | | | |
|---|---|---|---|
| 6,466,570 B1* | 10/2002 | Low et al. | 370/352 |
| 6,470,344 B1* | 10/2002 | Kothuri et al. | 707/696 |
| 6,697,805 B1* | 2/2004 | Choquier et al. | 707/610 |
| 6,789,088 B1* | 9/2004 | Lee et al. | 707/741 |
| 6,889,229 B1* | 5/2005 | Wong et al. | 707/610 |
| 6,961,910 B2* | 11/2005 | Lee et al. | 715/853 |
| 6,971,086 B2* | 11/2005 | Reddy et al. | 717/109 |
| 7,188,308 B2* | 3/2007 | Weise et al. | 715/273 |
| 7,269,602 B2* | 9/2007 | Kaappa | 707/104.1 |
| 7,292,250 B2* | 11/2007 | Sepulveda | 345/473 |
| 7,392,471 B1* | 6/2008 | Ford et al. | 715/234 |
| 7,505,976 B2* | 3/2009 | Kudo | 707/10 |
| 7,631,255 B2* | 12/2009 | Weise et al. | 715/229 |
| 7,664,773 B2* | 2/2010 | Hattori et al. | 707/999.102 |
| 7,716,150 B2* | 5/2010 | Cheng et al. | 706/45 |
| 7,849,402 B2* | 12/2010 | Weise et al. | 715/234 |
| 2004/0080542 A1* | 4/2004 | Bertram et al. | 345/810 |
| 2004/0093103 A1* | 5/2004 | Nakamura | 700/96 |
| 2004/0158583 A1* | 8/2004 | Kaappa | 707/104.1 |
| 2004/0205638 A1* | 10/2004 | Thomas et al. | 715/526 |
| 2004/0243938 A1* | 12/2004 | Weise et al. | 715/526 |
| 2005/0033732 A1* | 2/2005 | Chang et al. | 707/2 |
| 2005/0097110 A1* | 5/2005 | Nishanov et al. | 707/100 |
| 2005/0219250 A1* | 10/2005 | Sepulveda | 345/473 |
| 2005/0273460 A1* | 12/2005 | Abrams et al. | 707/2 |
| 2005/0289150 A1* | 12/2005 | Kudo | 707/10 |
| 2006/0168515 A1* | 7/2006 | Dorsett et al. | 715/513 |
| 2006/0248455 A1* | 11/2006 | Weise et al. | 715/526 |
| 2007/0174309 A1* | 7/2007 | Pettovello | 707/100 |
| 2007/0299867 A1* | 12/2007 | Baldwin et al. | 707/103 R |
| 2008/0228935 A1* | 9/2008 | Nam | 709/231 |
| 2010/0050131 A1* | 2/2010 | Weise et al. | 715/853 |
| 2010/0325181 A1* | 12/2010 | Skillcorn | 707/829 |
| 2011/0041099 A1* | 2/2011 | Weise et al. | 715/854 |

OTHER PUBLICATIONS

Lim, S. et al., "WebView: A Tool for Retrieving Internal Structures and Extracting Information from HTML documents," Aug. 6, 2002, ACM, Proceedings of the 6th International Conference on Database Systems for Advanced Applications, pp. 71-80.*

Wang, J., et al, "Wrapper Induction Based on Nested Pattern Discovery," Technical Report HKUST-CS-27-02, Department of Computer Science, Hong Kong University of Science and Technology, 2002, pp. 1-29.*

* cited by examiner

METHOD AND SYSTEM FOR DEFINING A HEIRARCHICAL STRUCTURE

TECHNICAL FIELD

This invention relates to the field of hierarchical structures. In particular, it relates to defining items and their locations in a hierarchical structure.

BACKGROUND OF THE INVENTION

In a content management system, items are typically stored in the system in a flat, largely unstructured format. These items may have attributes associated with them (for example a "name" and "author"), they may have links to other items, and they may have content (for example, a document text or an image). Efficient search mechanisms are provided for locating one or more items based on the value of their attributes.

The information is typically structured into some form of hierarchy. For example, a set of documents is often managed by structuring documents into folders with some folders containing nested folders, building up a tree or arbitrary graph structure. A user may want to manipulate and search for items based on this hierarchical structuring. For example, "find all documents in the folder X whose author is A"; or "move all documents in folder Y whose author is B to folder Z".

Figure 1A:
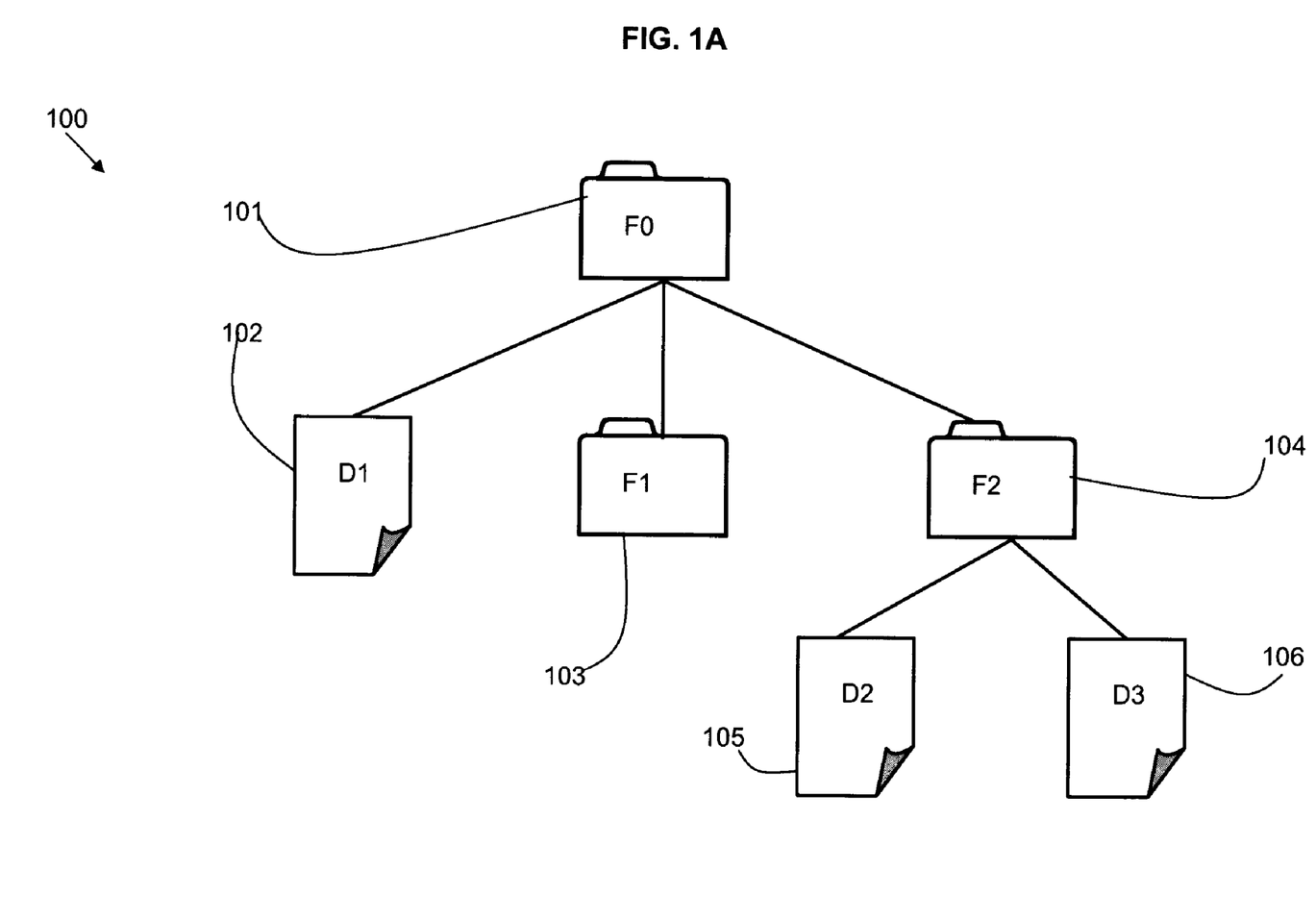
FIG. 1A is a representation of a simple hierarchy as known in the prior art.

An example of a hierarchical data structure is shown in FIG. 1A. This is a simple hierarchy 100 with a folder F0 101 at the root node of the tree, with child nodes in the form of a document D1 102, and two folders F1 103 and F2 104. Folder F2 has two child nodes in the form of documents D2 105 and D3 106.

In a typical implementation of a content manager system, items are used to represent the folders and documents, each having an attribute defining their name. The folder hierarchy is maintained using links between the parent folder item and the child folder or document items.

Figure 1B:
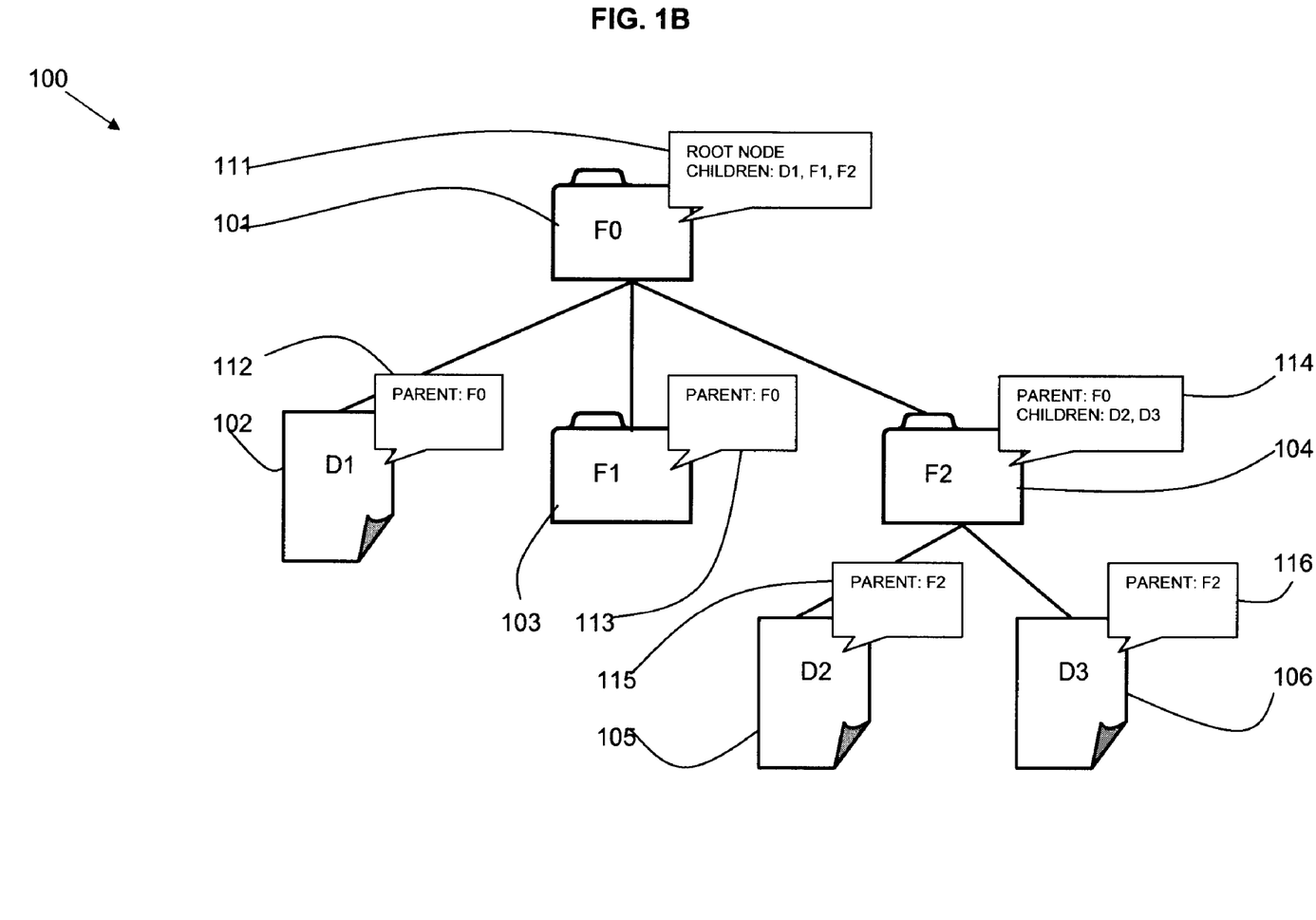
FIG. 1B is a representation of the hierarchy of FIG. 1A with each node having references to its parent and child nodes.

An example of a hierarchical data structure of this type is shown in FIG. 1B which is the same structure 100 as that of FIG. 1A showing each node with links to its parent and child nodes. The folder F0 101 has a reference 111 to it being the root node and having child nodes D1, F1 and F2. Document D1 102 and folder F1 103 have references 112, 113 indicating their parent is folder F0. Folder F2 104 has a reference 114 indicating that its parent is folder F0, and its child nodes are documents D2 and D3. Documents D2 105 and D3 106 have references 115, 116 indicating that their parent node is F2. The full path name from the root 101 of the hierarchy 100 to a leaf item can only be found by traversing the hierarchy 100 and constructing the resulting path.

This form of implementation has the following advantages: it is simple to construct—a new item can be added to the hierarchy by simply giving it a name and forming the links between parent and child; it is simple to change—an item (including a whole sub-tree of the hierarchy) can be moved simply by breaking and remaking two links. Since a content manager system is often a multi-user system, locks on items and transactions are required during these operations and with this implementation only a small number of locks and short lived transactions are required.

However, there are some problems with this implementation of a content manager system in providing some commonly required functions. To find the full path name for a folder or document requires traversing the hierarchy structure from the root to the leaf and this can be expensive in terms of calls to an underlying database. It is also difficult to efficiently perform certain types of queries, without resorting to iterative or recursive methods which again can be expensive in terms of database accesses.

A solution to these problems can be provided by storing the full folder path name as an attribute of each item as well as (or perhaps instead of) that item's terminal name. This allows simple and rapid retrieval of that full path name and enables efficient search and retrieval of sets of items from a database based on patterns matching complete or partial folder paths. Only one database call may be needed to retrieve many items.

Figure 1C:
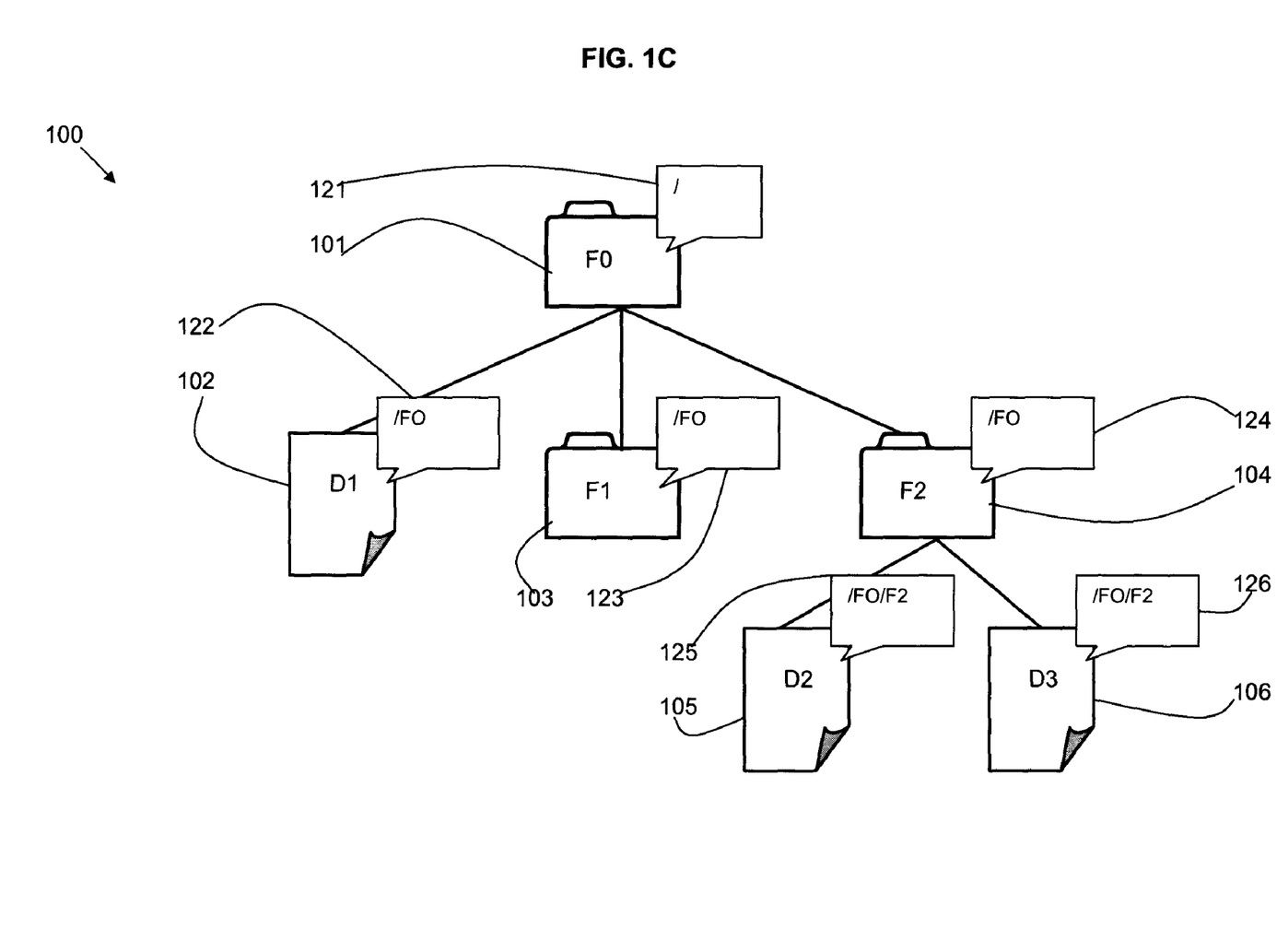
FIG. 1C is a representation of the hierarchy of FIG. 1A with each node having an attribute of its path name.

An example of a hierarchical data structure of this type is shown in FIG. 1C which is the same structure 100 as that of FIG. 1A showing each node having its path name as an attribute. Folder F0 101 has an attribute 121 showing the path name "/" indicating it is the root node. Document D1 102, folder F1 103, and folder F2 104 have attributes 122, 123, 124 showing the path name "/F0". Document D2 105 and document D3 106 have attributes 125, 126 showing the path name "/F0/F2".

The cost of this form of implementation is that it is no longer simple to manipulate the hierarchy itself. Renaming a folder or moving a folder sub-tree from one place to another becomes very expensive as there may be many items whose "full path" attributes need to be changed. Not only does this require a lot of database access but it requires many locks to be obtained and potentially quite long running transactions to be established. There is also the problem that other users may already have locks on some of the items that require "full path" updates during these operations.

SUMMARY OF THE INVENTION

It is an aim of this invention to provide a way to represent and manipulate an item hierarchy in a simple way, yet still being able to exploit search capabilities to quickly find items within individual folders, folder trees, or collections of folders.

It is a further aim of this invention to enable the efficient processing of the hierarchical structure.

Although the background art is described in the context of a content manager system, this invention applies to other environments in which objects are represented in a hierarchical structure including, but not limited to, file systems, database systems, asset management systems, document management systems, etc.

According to a first aspect of the present invention there is provided a method for defining a hierarchical structure, comprising: providing object items for objects represented in the hierarchical structure, each object item having a name and a link; providing a node item having a name in the form of a hierarchical path name, wherein a node item is provided for each unique path name in the hierarchical structure; wherein the link for an object item links to a single node item having the hierarchical path name of the object.

Each node item may have a link to one or more object items. In one embodiment, the object items and node items have properties, wherein the names and links are provided as properties. In another embodiment, the object items and node items are entries in a table, the entries having a name, and the links are provided in a table defining the start and end of the link.

An object item may represents an object that defines the structure and has nested objects within it. An object item may also represent an object that has an associated content.

The method may include following the link from an object item to determine the path name of an object. The method may also include searching objects in the hierarchical structure by following links between object items and node items. The method may further include manipulating objects in the hierarchical structure by changing links between object items and node items. The method may further include searching objects in the hierarchical structure by pattern matching of object item and node item names.

According to a second aspect of the present invention there is provided a hierarchical data structure, comprising: a plurality of object items for objects represented in the hierarchical structure, each object item having a name and a link; a plurality of node items, each having a name in the form of a hierarchical path name, wherein a node item is provided for each unique path name in the hierarchical structure; wherein the link of an object item links to a single node item having the hierarchical path name of the object.

The objects may include folders and documents in a content management system. The objects may alternatively include directories and files in a file management system. The objects may be stored in a relational database.

According to a third aspect of the present invention there is provided a system for defining a hierarchical data structure, comprising: means for providing a plurality of object items for objects represented in the hierarchical structure, each object item having a name and a link means for providing a plurality of node items, each having a name in the form of a hierarchical path name, wherein a node item is provided for each unique path name in the hierarchical structure; wherein the link of an object item links to a single node item having the hierarchical path name of the object.

According to a fourth aspect of the present invention there is provided a computer program product stored on a computer readable storage medium, comprising computer readable program code means for performing the steps of: providing object items for objects represented in the hierarchical structure, each object item having a name and a link; providing a node item having a name in the form of a hierarchical path namer wherein a node item is provided for each unique path name in the hierarchical structure; wherein the link for an object item links to a single node item having the hierarchical path name of the object.

The described method and system provide an improved definition of a hierarchical structure by representing each object (such as a folder or document) using two items: one item to represent the object (folder or document) itself, and one to contain the path information describing the object's place in the hierarchy. A combination of links, name and full path attributes are used to allow both efficient searching and manipulation of the items and the hierarchy.

BRIEF DESCRIPTION OF THE DRAWINGS

Embodiments of the present invention will now be described, by way of examples only, with reference to the accompanying drawings in which.

DETAILED DESCRIPTION

A system is provided for representing objects such as folders or directories and documents or files in a hierarchical structure. The system may be implemented in a content management system, a file system, a database system, an asset management systems, a document management systems, or any other system in which a hierarchical representation of objects requires searching and manipulation.

Figure 2A:
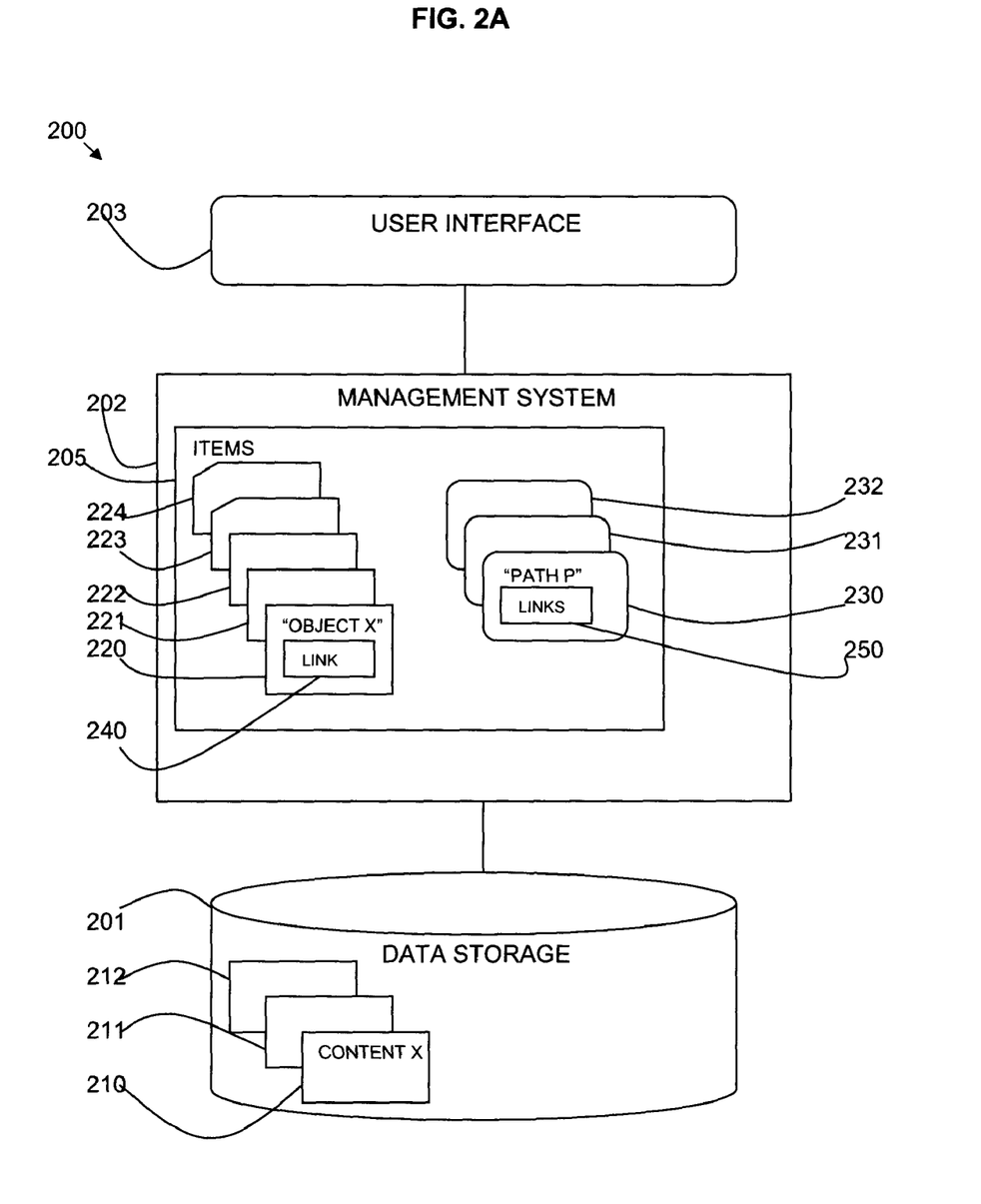
FIG. 2A is a block diagram of a first embodiment of a system in accordance with the present invention.

Referring to FIG. 2A, a first embodiment of a system 200 is shown having a data storage means 201, a management system 202 for managing content stored in the data storage means 201, and a user interface 203 for a user to interact with the management system 202.

As an example, the management system 202 may be a content management system for organizing and facilitating collaborative creation of documents and other content. In one embodiment, a content management system may be a web application used for managing web sites and web content. In another embodiment, a content management system may be used for storage and sourcing of documentation for an organization.

As another example, the management system 202 may be a disk file system managing the storage of files in disk storage.

The data storage means 201 may be a database including flat file databases, relational databases, object oriented databases, or an XML-based data repository, or a files storage system such as disk storage.

The data storage means 201 may be local to the management system 202, or it may be remote to the management system 202 with communication via a network.

The management system 202 uses items 205 to structure and manage stored information. An item 205 is anything storable on the management system 202. To enable items 205 to be subsequently located and manipulated meta-data is associated with each item stored. Meta-data in this sense is a set of properties each having a name and value. A programmer provides an "item type" or template for the kinds of items 205 they want to store, which defines the names and datatypes of those meta-data properties. When actual instances of those "item types" (ices the items themselves) are stored, values are assigned to properties associated with that item.

Various types of properties are possible but the two types used here are "string" (free form text) and "link" (a double-ended pointer from one item to another). String properties are very common and so generally fairly simple and efficient in their underlying implementation, particularly for searching. Searching strings based on pattern matching is a common idiom and generally easy to understand.

Items 205 may take different forms. Items may represent objects either with or without content.

A first type of item 220, 221, 222 may be a document or file that has text content. An item 220, 221, 222 is created to represent the document in the management system 202 and has properties defining meta-data of the document. The item 220, 221, 222 may store the content itself or may connect the item 220, 221, 222 to the document content 210, 211, 212 stored elsewhere, for example, as stored in a data storage means 201.

A second type of item 223, 224 may be a folder or directory that maintains a structure, such as a hierarchy structure, and enables other documents or folders to be nested within it. This second type of item 223, 224 has properties defining meta-data of the folder, but does not have stored content.

In the described system, a further type of item 230, 231, 232 referred to as a node item is defined, which represents and maintains the hierarchical structure that has been defined. Each node item 230, 231, 232 has an property of a path name through the hierarchy.

Items 220-224 of the first and second type for documents and folders each have a property in the form of a link 240 to a node item 230, 231, 232.

Node items 230, 231, 232 have sets of links 250 for the items 220-224 which have the name of the node item as its path in the hierarchy. Optionally, the node items 230, 231, 232 have sets of links to other node items that are parent or child nodes of the node item.

The three items types may be defined as follows with meta-data properties including:

DocumentItem
Name: String
Node: Link
FolderItem
Name: String
Node: Link
NodeItem
Path: String
Contents: Set of Links Items of type "NodeItem" are created to represent and maintain the hierarchical structure that has been defined. The "path" property of these is a text string containing the full path name of this node's position in the hierarchical tree. In this implementation a "/" character is used to separate the names of the nodes that form the path.

Items of type "DocumentItem" or "FolderItem" are created to represent the actual folders or documents defined. The "name" property of these is a text string containing just the document or folder name. The "node" property is a link to the "NodeItem" that represents this document or folder's position in the hierarchy. To correspond with this the "contents" property on the "NodeItem" is a set of links which will include a link back to the document or folder item.

Figure 2B:
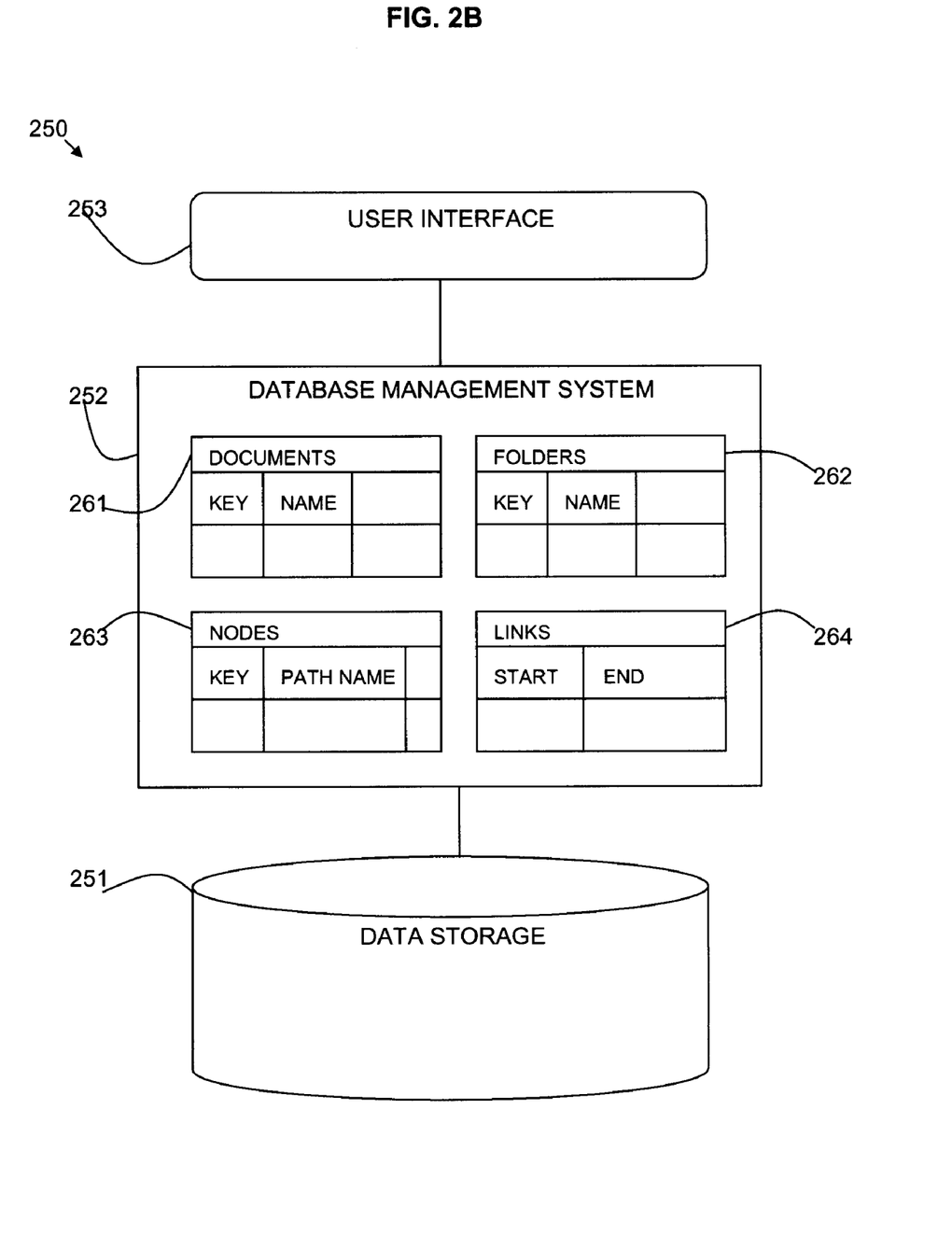
FIG. 2B is a block diagram of a second embodiment of a system in accordance with the present invention.

Referring to FIG. 2B, a second embodiment of a system 250 is shown having a data storage means in the form of a relational database 251, a database management system 252 for managing content stored in the database 251, and a user interface 253 for a user to interact with the management system 252.

The database management system 252 includes four tables, one to represent documents 261, one to represent folders 262 one to represent nodes 263, and one to represent links 264 (from documents/folders to/from nodes).

There is one row in the document table 261 for each document one row in the folder table 262 for each folder, one row in the node table 263 for each node and one row in the links table 264 for each link. The rows in the documents and folders tables 261 262 have a column containing a unique "key" for each document/folder and a column for the document/folder name. The tables also have any other columns needed.

The rows in the nodes table 263 have a column containing a unique "key" for each node and a column for the path name. Since the path names are themselves unique, the path name column itself may be used as the key.

Each row in the links table 264 has a column for each end of the link. These are foreign-key relations to the keys in the document/folder tables 261, 262 and the node table 263.

Many operations can be reduced to simple text pattern matching against the names columns in the database tables. This is usually very efficient in a typical relational database system.

Figure 3:
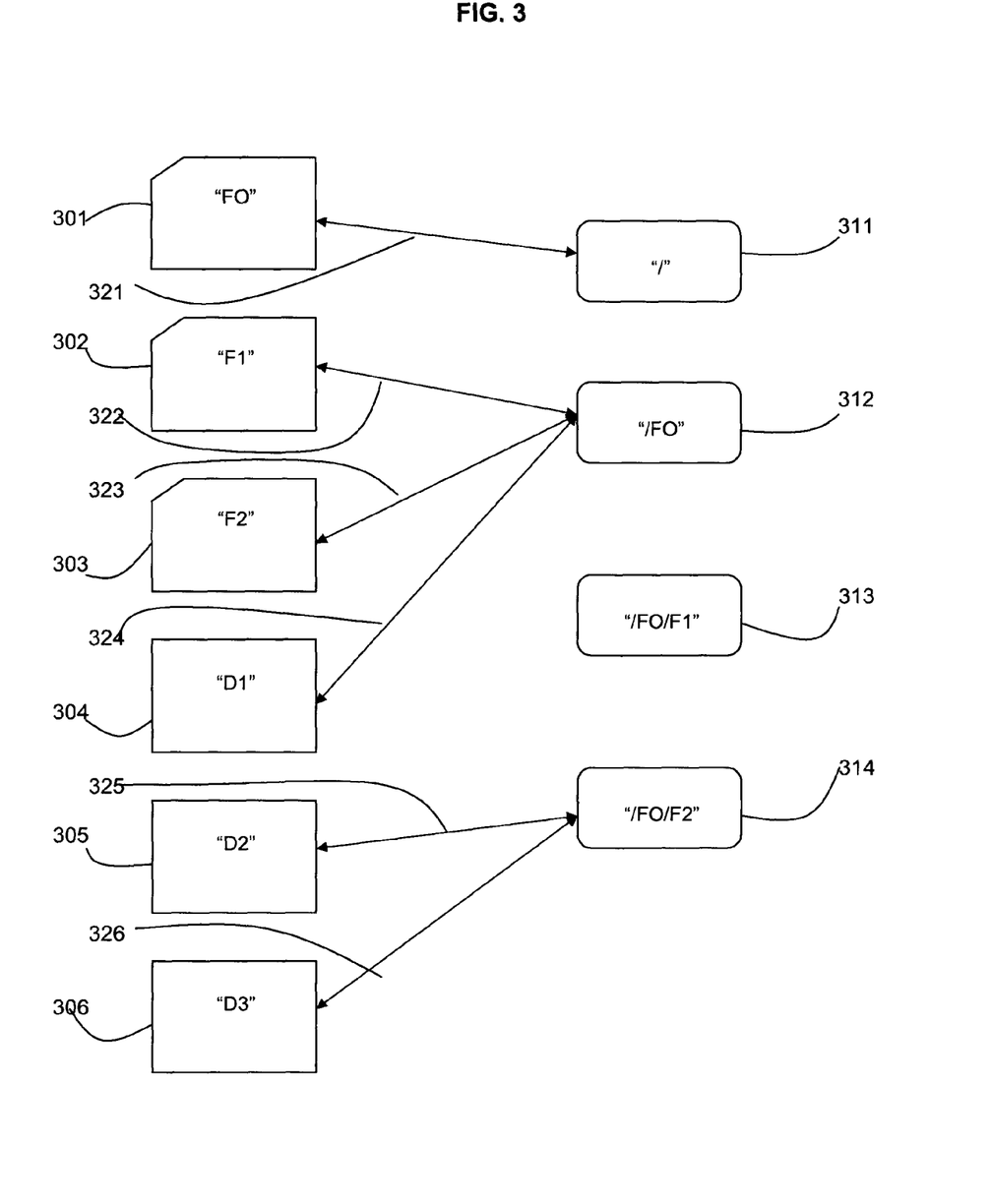
FIG. 3 is representation of the items represented in the system of FIGS. 2A and 2B in accordance with the present invention.

Referring to FIG. 3, the hierarchical structure 100 of FIG. 1A is shown as items. The items are representations of objects, for example, content management system items, or database table entries, which are used to define the hierarchical structure.

Each item shows quotes representing the value of a name of each of the items. The name may be, for example, an attribute of the item or a name associated with a database table entry. The arrows between the items represent links of the items. The links may be, for example, provided as an attribute of an item or as a link defined in a database table of links between database table entries.

The items 301-306 on the left include the items 301-303 representing the three folders (folders 101, 103, 104 of FIG. 1A) and the items 304-306 representing the three documents (102, 105, 106 of FIG. 1A). The additional items 311-314 (shown with curved corners) are node items having a value of a data path. Item 311 has a of value "/", item 312 has a of value "/FO", item 313 has a of value "/FO/F1", and item 314 has a of value "/FO/F2".

Each of the items 301-306 representing an object (a folder or document in this case) has a link 321-326 to the one of the node items 311-314 which provides the object's data path.

Folder F0 is the root node and therefore item 301 is linked 321 to the node item 311 for data path "/". Items 302-304 for folder F1, folder F2 and document D1 are each linked 322-324 to the node item 312 for the data path "/FO". Items 305, 306 for documents D2 and D3 are each linked 325, 326 to the node item 314 for the data path "/FO/F2". The node item 313 for the data path "/FO/F1" does not have a link to it from an item representing an object as there are no objects in the hierarchy with this data path.

The node items 311-314 representing the data paths enable quick and efficient query, search and manipulation of the hierarchy for most typical operations.

The following example operations are described using the items representing the objects and data paths:

Obtaining the full path name for a document.

This operation requires following one link from the item representing the document. The attribute or name value of the item representing the document and the attribute or name value of the node item representing the data path are concatenated to obtain the full data path name for the document.

Figure 4A:
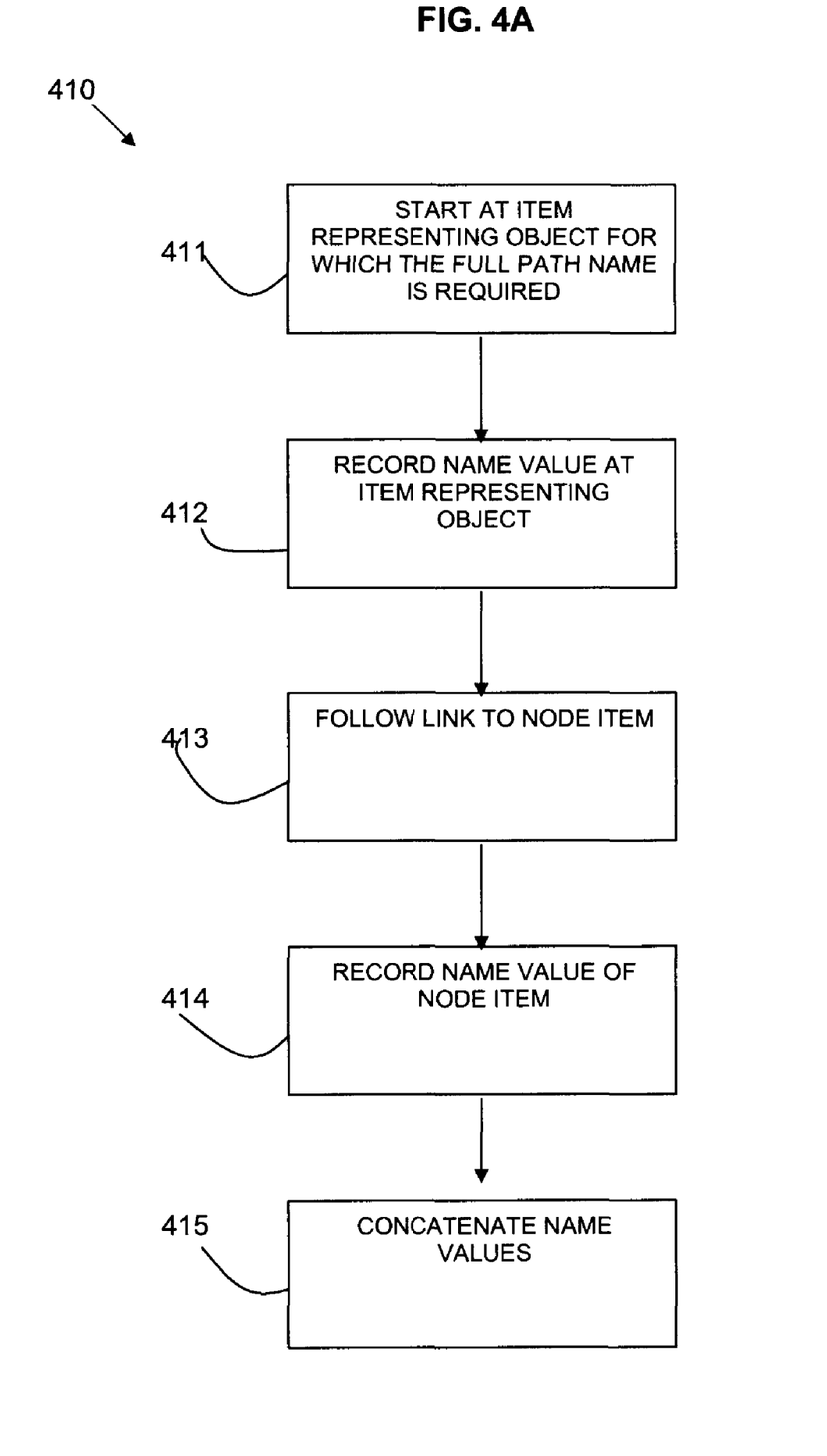
FIGS. 4A to 4E are flow diagrams of methods in accordance with the present invention.

FIG. 4A shows a flow diagram 410 of this operation. Start 411 at the item representing the object for which a full path name is required. Record 412 the name value of the item. Follow 413 the link to the node item. Record 414 the name value of the node item. Concatenate 415 the record 412 of the name value of the starting item and the record 414 of the name value of the node item to obtain the full data path for the object.

For example, in FIG. 3, the full path name for document D2 is obtained by starting at item 305 for document D2, following the link 325 to item 314 which has the name value "/FO/F2". Concatenating the name values of item 305 ("D2") and item 314 ("/FO/F2") to give the full path name of "/FO/F2/D2".

Moving a document to a new folder.

This requires changing one link between the document item and the matching node item.

Figure 4B:
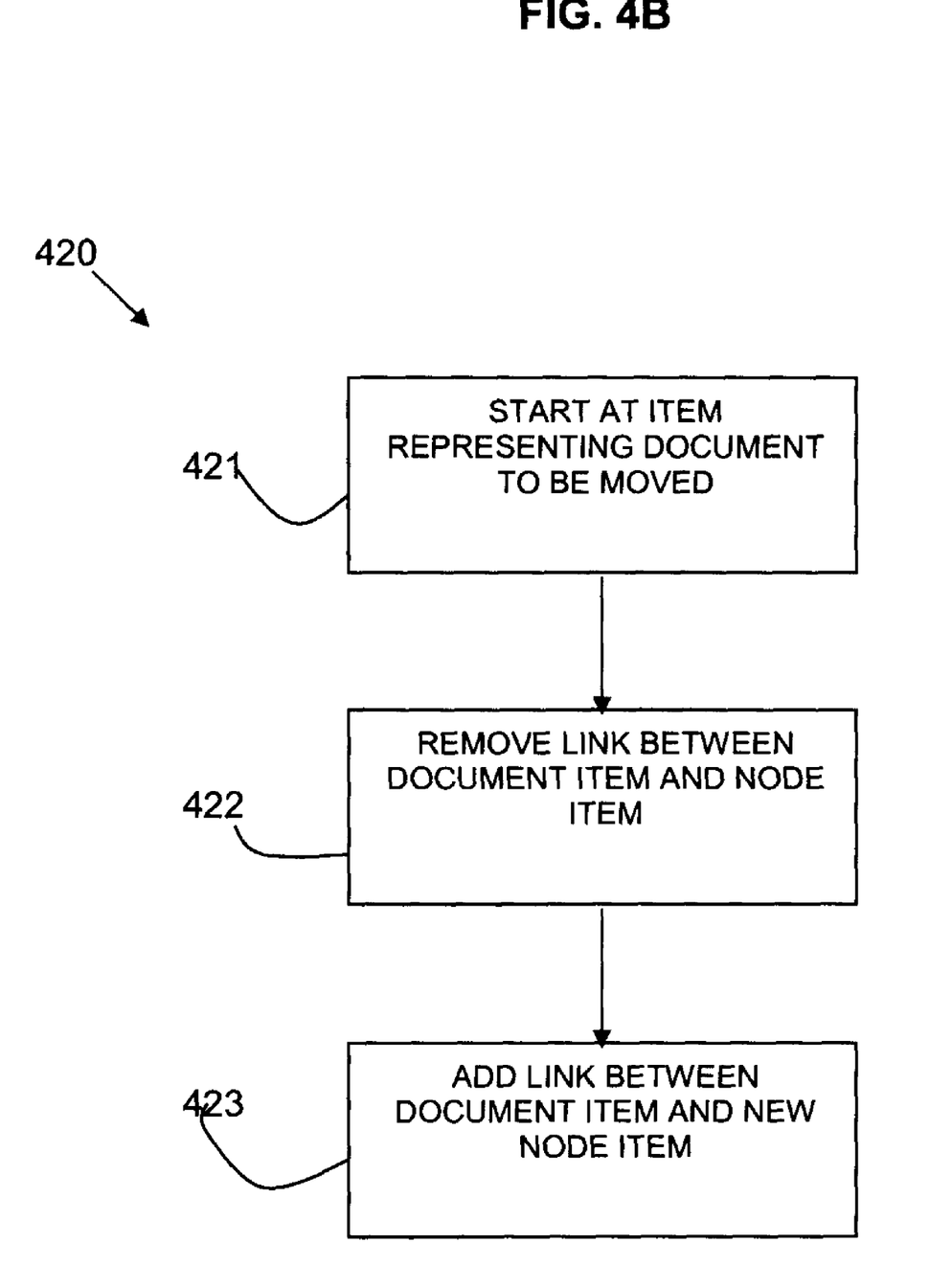

FIG. 4B shows a flow diagram 420 of this operation. Starting 421 at the item representing the document to be moved, remove 422 the link to the current node item. Add 423 a link between the document item and the new node item representing the new location of the document.

For example, in FIG. 3, document D2 can be moved from folder F2 to folder F1. The link 325 from item 305 to node item 314 is removed. A new link is added from item 305 to node item 313 which has the attribute of value "/F0/F1".

Searching for all documents within a folder.

This requires following a single level of links from the node item for the folder back to the child documents items.

Figure 4C:
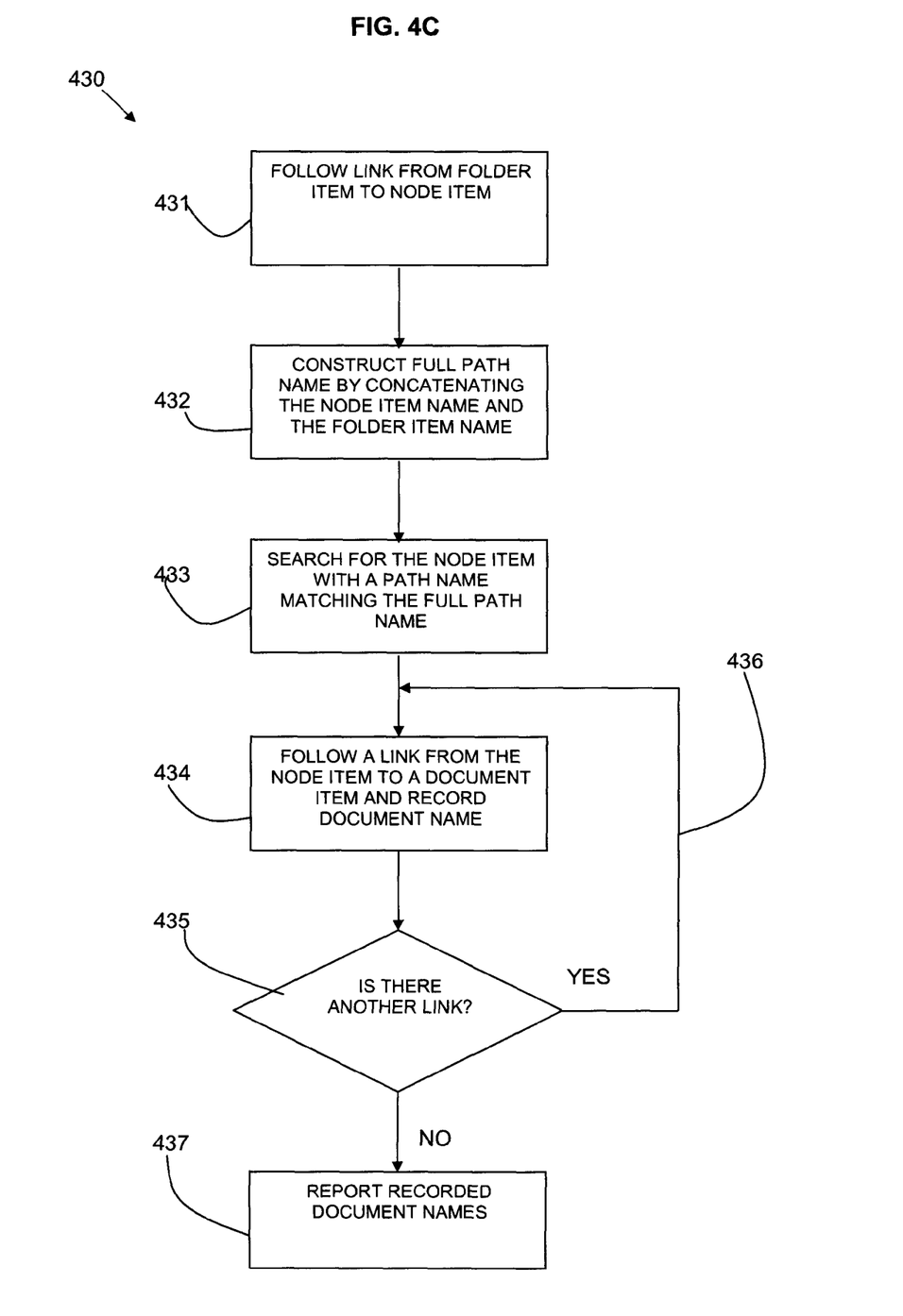

FIG. 4C shows a flow diagram 430 of this operation. Start 431 by following the link from the folder item to the node item. Construct the full path name 432 by concatenating the node item path name and the folder item name. Search 433 for the node item with a path name matching the full path name. Follow a link 434 from the node item to a document item and record the document name. Determine 435 if there is another link. If so, loop 436 and repeat step 434. If there are no more links, report 437 the recorded document names.

For example, in FIG. 3, a search may be required for all documents within folder F2. Starting at the folder item 303 for F2, the link 323 is followed to node item 312 for data path "/F0". The full path name for folder F2 can now be constructed by concatenating the node path and folder name to give "/F0/F2". A search is done for the node item with a path name that exactly matches "/F0/F2" and item 314 is found. The links 325, 326 are followed back to document items 305, 306 and the document names "D2" and "D3" are recorded.

Searching for all documents in folders with names matching a pattern

This is a two step process: first find the collection of node items whose name attributes include the required pattern, and secondly, follow the links from each node item to all document items and record the document names.

Figure 4D:
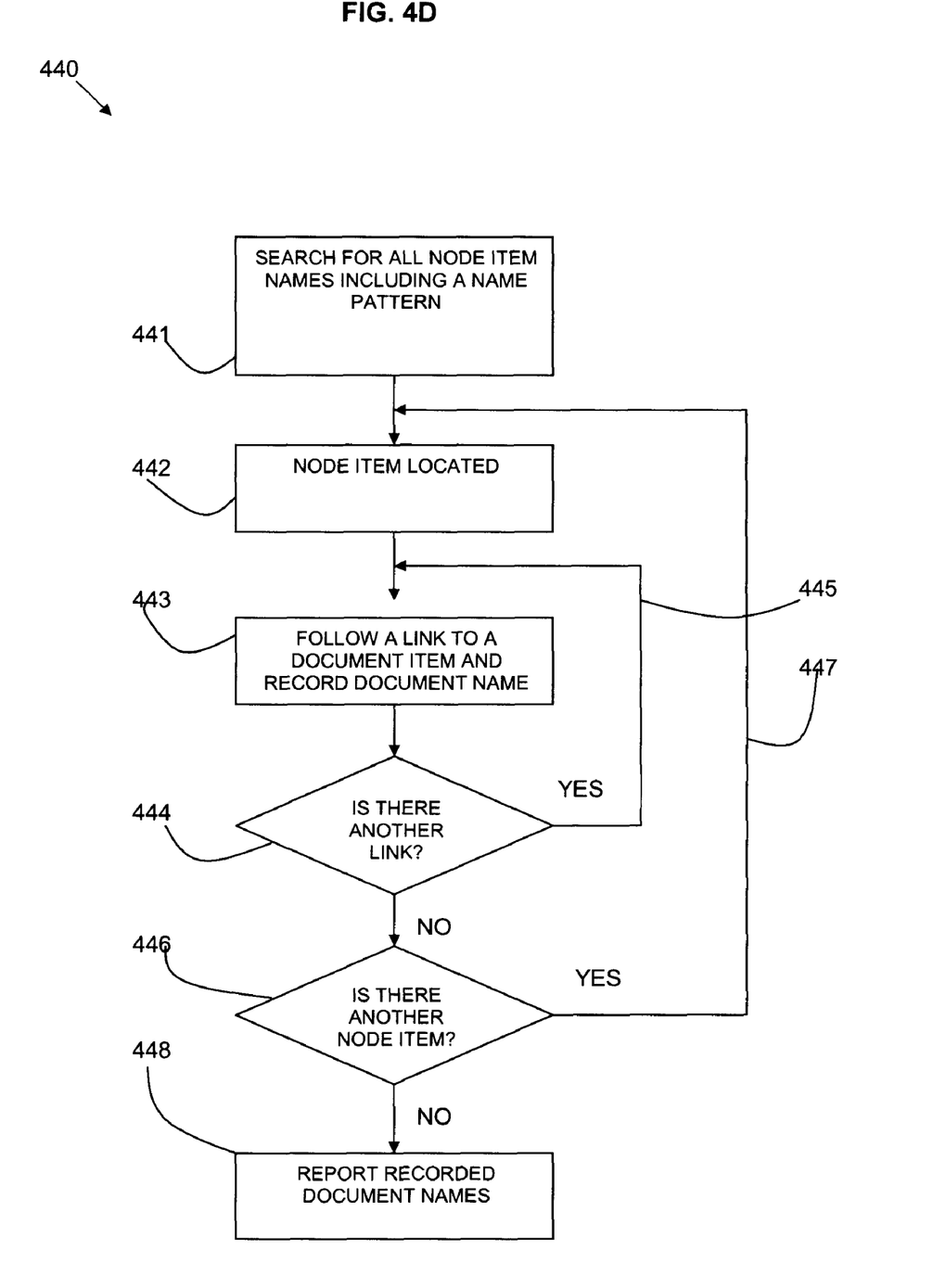

FIG. 4D shows a flow diagram 440 of this operation. A search 441 is carried out for all node item names including a name pattern. For a node item located 442, follow a link 443 to a document item and record the document name. Determine if there are any more links 444 from the node item and, if so, loop 445 to repeat step 443 for the next sink. If there are no more sink items for the node item, determine 446 if there is a next node item including the name pattern. If so, loop 447 to repeat from step 442 for the next node item. If not, report 448 all recorded document names.

For example, in FIG. 3, a search may be made for all documents in folders with the name "F . . . ". The first step performs a search against the node items to find all node items whose path name matches a text pattern "%/F%", where "%" represents any sequence of zero or more characters. This locates the three node items 312, 313 and 314. From these three node items, follow the links back to document items 324, 325 and 326 to find documents 304, 305, 306. Document names "D1", "D2" and "D3" are recorded.

Renaming a folder

This is a slightly more complex operation which involves renaming the folder item itself and updating the path name attribute in the node items for all items at and below that folder in the hierarchy.

This will typically involve updating several node items which will require locks over those items; however the number of folders is expected to be small compared with the number of documents and these locks are expected to only be required for a short time.

Figure 4E:
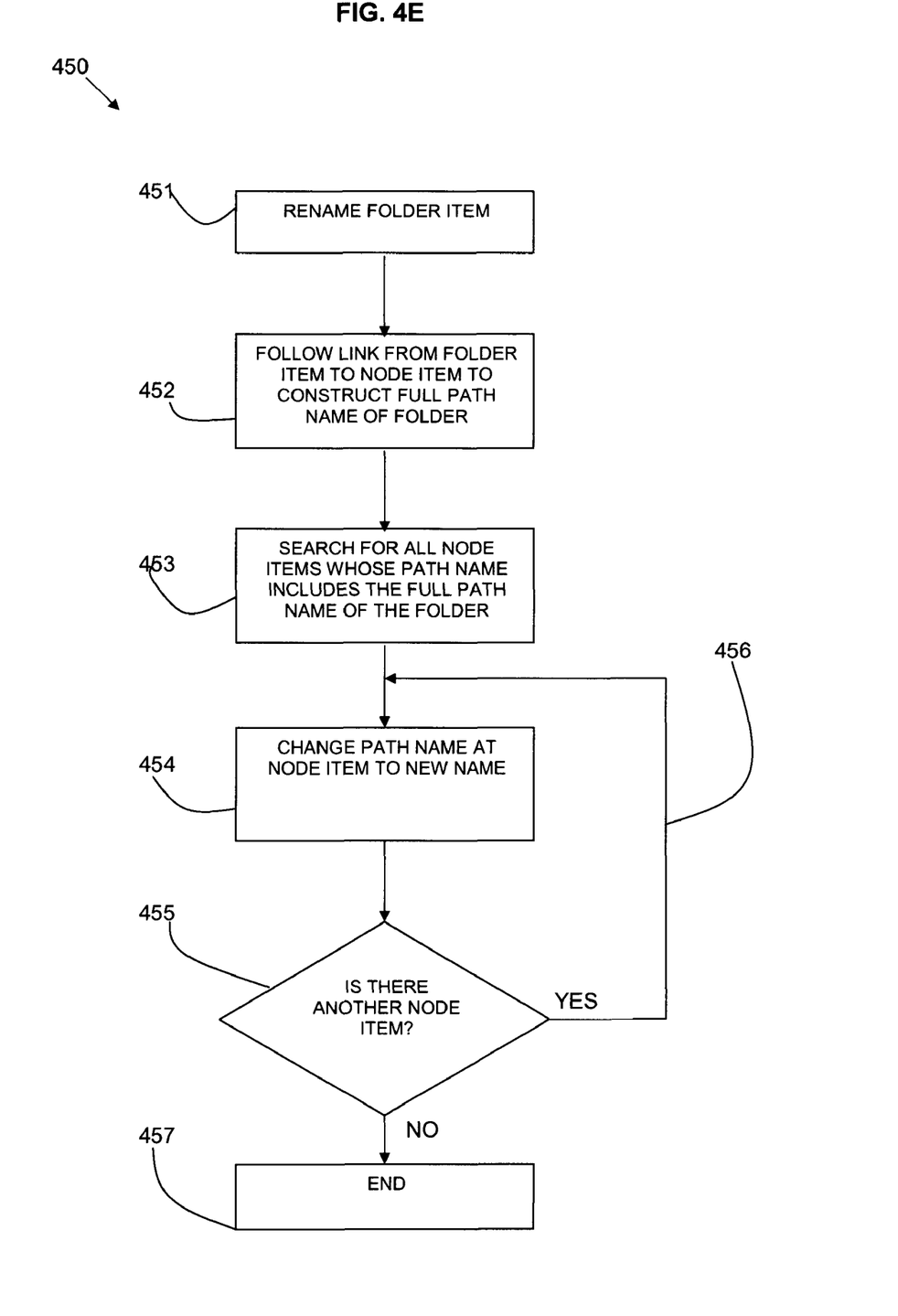

FIG. 4E shows a flow diagram 450 of this operation. The folder item is renamed 451 and the link to the node item is followed 452 to construct the full path name of the folder. Search 453 for all node items whose path name includes the full path name of the folder. For a path item located, change 454 the path name to the new name. Determine if there is a next node item 455 and, if so, loop 456 to repeat step 454. If not end the process 457.

For example, if folder "F0" is to be renamed "F", folder 301 is renamed "F" and link 321 is followed to construct the original full path name for the folder, i.e. "/F0". A search of the node items is done to find all node items whose path name matches the pattern "/F0/%", where "%" represents and sequence of zero or more characters. This locates three node items 312, 313 and 314. The path names of all these node items are changed by replacing the initial "/F0" text with "/F".

Moving a folder within the hierarchy

This is a variation on renaming a folder.

The described method and system provide a technique for imposing a hierarchical structure on objects. The objects may not themselves be stored in a hierarchical form. The hierarchical structure enables the efficient processing of the objects by using string matching techniques.

The invention can take the form of an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A processor-implemented method for defining a hierarchical structure, said processor-implemented method comprising:

a processor providing object items for objects represented in the hierarchical structure, each object item having a name and a link stored within a database;

the processor providing a node item having a name in the form of a hierarchical path name, wherein a unique node item is provided for each unique path name in the hierarchical structure, wherein the node item is a leaf node in the hierarchical structure, wherein a name of the leaf node is a full path name that directly describes a full hierarchical pathway from the leaf node to a root node in the hierarchical structure, wherein the full hierarchical pathway is constructed by concatenating a path name for the leaf node with a path name for the root node, wherein a link for an object item links to a single node item having the hierarchical path name of an object, and wherein each node item in the hierarchical structure has a link to an object item;

the processor manipulating objects represented by the hierarchical structure by changing links between object items and node items; and the processor searching for objects represented by the hierarchical structure by pattern matching of object items and node item names.

2. The processor-implemented method as claimed in claim 1, wherein the object items and node items have properties, wherein names and links are provided as properties.

3. The processor-implemented method as claimed in claim 1, wherein the object items and node items are entries in a table, the entries having a name, and links are provided in a table defining the start and end of each of the links.

4. The processor-implemented method as claimed in claim 3, wherein each of the object items represents an object that defines the hierarchical structure and contains nested objects.

5. The processor-implemented method as claimed in claim 3, wherein each of the object items represents an object that has an associated content.

6. The processor-implemented method as claimed in claim 1, further comprising:
the processor following the link from an object item of said object items to determine the path name of an object.

7. The processor-implemented method as claimed in claim 1, further comprising:
the processor searching objects in the hierarchical structure by following links between object items and node items.

8. A computer comprising:
a processor, a memory unit, and a non-transitory computer readable media;
first program instructions to provide object items for objects represented in the hierarchical structure, each object item having a name and a link stored within a database;
second program instructions to provide a node item having a name in the form of a hierarchical path name, wherein a unique node item is provided for each unique path name in the hierarchical structure, wherein the node item is a leaf node in the hierarchical structure, wherein a name of the leaf node is a full path name that directly describes a full hierarchical pathway from the leaf node to a root node in the hierarchical structure, wherein the full hierarchical pathway is constructed by concatenating a path name for the leaf node with a path name for the root node, wherein a link for an object item links to a single node item having the hierarchical path name of an object, and wherein each node item in the hierarchical structure has a link to an object item;
third program instructions to manipulate objects represented by the hierarchical structure by changing links between object items and node items; and
fourth program instructions to search for objects represented by the hierarchical structure by pattern matching of object items and node item names; and wherein
said first, second, third, and fourth program instructions are stored on said computer readable media for execution by said processor via said memory unit.

9. The computer as claimed in claim 8, wherein the object items and node items have properties, wherein names and links are provided as properties.

10. The computer as claimed in claim 8, wherein the object items and node items are entries in a table, the entries having a name, and links are provided in a table defining the start and end of each of the links.

11. The computer as claimed in claim 8, wherein each of the object items represents an object that defines the hierarchical structure and has nested objects within it.

12. The computer as claimed in claim 8, wherein each of said one or more object items represents an object that has an associated content.

13. A non-transitory computer readable storage medium containing program instructions which when executed by a computer cause the computer to perform a method for defining a hierarchical structure, comprising:
instructions for providing object items for objects represented in the hierarchical structure, each object item having a name and a link stored within a database;
instructions for providing a node item having a name in the form of a hierarchical path name, wherein a unique node item is provided for each unique path name in the hierarchical structure, wherein the node item is a leaf node in the hierarchical structure, wherein a name of the leaf node is a full path name that directly describes a full hierarchical pathway from the leaf node to a root node in the hierarchical structure, wherein the full hierarchical pathway is constructed by concatenating a path name for the leaf node with a path name for the root node, wherein a link for an object item links to a single node item having the hierarchical path name of an object, and wherein each node item in the hierarchical structure has a link to an object item;
instructions for manipulating objects represented by the hierarchical structure by changing links between object items and node items; and
instructions for searching for objects represented by the hierarchical structure by pattern matching of object items and node item names.

14. The non-transitory computer readable storage medium as claimed in claim 13, wherein the object items and node items have properties, wherein the names and links are provided as properties.

15. The non-transitory computer readable storage medium as claimed in claim 13, wherein the object items and node items are entries in a table, the entries having a name, and the links are provided in a table defining the start and end of the link.

16. The non-transitory computer readable storage medium as claimed in claim 13, wherein an object item represents an object that defines the hierarchical structure and contains nested objects.

17. The non-transitory computer readable storage medium as claimed in claim 13, wherein an object item represents an object that has an associated content.

18. The non-transitory computer readable storage medium as claimed in claim 13, further comprising:
instructions for following the link from an object item to determine the path name of an object.

19. The non-transitory computer readable storage medium as claimed in claim 13, further comprising:
instructions for searching objects in the hierarchical structure by following links between object items and node items.

* * * * *